(12) United States Patent
Farley et al.

(10) Patent No.: US 8,711,687 B2
(45) Date of Patent: *Apr. 29, 2014

(54) SYSTEM AND METHOD FOR BACKUP COMMUNICATION OVER ETHERNET

(75) Inventors: Joseph D. Farley, Warwick, MA (US); Heinrich Zettler, Munich (DE); Werner Schuhmann, Munich (DE)

(73) Assignees: Tyco Fire & Security GmbH, Neuhausen am Rheinfall (CH); Total Walther GmbH, Feuerschutz und Sicherheit, Cologne (DE)

( * ) Notice: Subject to any disclaimer, the term of this patent is extended or adjusted under 35 U.S.C. 154(b) by 84 days.

This patent is subject to a terminal disclaimer.

(21) Appl. No.: 13/302,961

(22) Filed: Nov. 22, 2011

(65) Prior Publication Data

US 2013/0128727 A1    May 23, 2013

(51) Int. Cl.
    *H04L 12/26* (2006.01)
(52) U.S. Cl.
    USPC .......................................... 370/228; 370/231
(58) Field of Classification Search
    USPC ........................................ 370/252, 253, 228
    See application file for complete search history.

(56) References Cited

U.S. PATENT DOCUMENTS

| | | | | |
|---|---|---|---|---|
| 6,074,345 A | * | 6/2000 | van Oostrom et al. | 600/300 |
| 7,583,703 B2 | * | 9/2009 | Bowser et al. | 370/487 |
| 2004/0190464 A1 | | 9/2004 | Tesdahl et al. | |
| 2006/0109728 A1 | * | 5/2006 | Dwelley et al. | 365/222 |
| 2006/0202838 A1 | * | 9/2006 | Hawthorne et al. | 340/573.1 |
| 2006/0221995 A1 | * | 10/2006 | Berkman | 370/463 |
| 2007/0147354 A1 | | 6/2007 | He | |
| 2007/0253382 A1 | * | 11/2007 | Ghassemzadeh et al. | 370/338 |
| 2009/0212925 A1 | | 8/2009 | Schuman, Sr. et al. | |
| 2009/0217080 A1 | * | 8/2009 | Ferguson et al. | 714/4 |
| 2010/0049830 A1 | * | 2/2010 | Chenu et al. | 709/218 |
| 2010/0091819 A1 | * | 4/2010 | Ghassemzadeh et al. | 375/141 |
| 2012/0017206 A1 | * | 1/2012 | Ferguson et al. | 717/171 |

(Continued)

FOREIGN PATENT DOCUMENTS

| | | |
|---|---|---|
| EP | 1632666 A2 | 2/2006 |
| GB | 2468925 A | 9/2010 |
| WO | 2005043363 A1 | 5/2005 |
| WO | 2006055163 A1 | 5/2006 |

OTHER PUBLICATIONS

International Search Report and Written Opinion from corresponding PCT/US2012/066208.

(Continued)

*Primary Examiner* — Gary Mui
(74) *Attorney, Agent, or Firm* — Kacvinsky Daisak PLLC

(57) ABSTRACT

A system and method for providing backup communications over an Ethernet cable are disclosed. A backup communication system (BCS) is provided as part of a networked (TCP/IP) hospital communication system. The BCS is coupled to an Ethernet cable used for normal TCP/IP communications. When TCP/IP communications are interrupted, the BCS receives patient call signals from patient room terminals over a secondary communication mode of the Ethernet cable, and transmits those call signals to a nurses' station. The call signals are transmitted as voltage coded data such as voltage pulses or static levels. The voltage can include call information. 10V can represent a normal patient call, 15V can represent a patient emergency call, and 24V can represent a code call. Information can be relayed back to the room terminals using the same signaling technique. Thus, basic communications can be achieved when TCP/IP communications are unavailable. Other embodiments are disclosed and claimed.

24 Claims, 7 Drawing Sheets

(56) References Cited

U.S. PATENT DOCUMENTS

| | | | |
|---|---|---|---|
| 2012/0053962 A1* | 3/2012 | Routh et al. | 705/2 |
| 2012/0184120 A1* | 7/2012 | Basta et al. | 439/213 |
| 2013/0011142 A1* | 1/2013 | Goodson et al. | 398/98 |
| 2013/0073874 A1* | 3/2013 | Eghbal | 713/300 |

OTHER PUBLICATIONS

International Search Report and Written Opinion from PCT/US2012/066243.

* cited by examiner

SYSTEM AND METHOD FOR BACKUP COMMUNICATION OVER ETHERNET

FIELD OF THE DISCLOSURE

The disclosure relates generally to systems and methods for communicating between components of a patient care system, and more particularly to a system and method for providing backup communications over Ethernet cabling when TCP/IP communications failures occur in a patient care system.

BACKGROUND OF THE DISCLOSURE

Hospitals typically include a variety of devices in patient rooms to enable the patient to communicate with a nurses' station. The hospital room communication devices may include a nurse call button, a microphone, a speaker, and the like. These devices enable the patient, or a nurse in the patient's room, to exchange a variety of emergency and non-emergency information with the nurses' station. These communication devices can be implemented as part of a larger network that services multiple rooms and floors of a hospital. Such networks may implement a TCP/IP protocol in which the hospital room devices are individually addressable, which enables a networked monitoring system to recognize which room a call is coming from.

As will be appreciated, these room communications devices can be used in the event of a patient emergency. As such, it is important that the devices be functional at all times. Where a portion of the communication network (such as, but not limited to, a gateway or a switch) malfunctions, however, continued communication between patient rooms and nurses' stations can be compromised. Current systems address this issue by employing one or more additional Ethernet cables, connected between the room communications devices and the nurses' station, to provide a dedicated mode for the room communications devices. Such redundant Ethernet cabling solutions, however, suffer from the obvious disadvantage that the additional cables are costly and are time consuming to install. Such redundant cable solutions also necessitate the use of an additional intelligent device to connect the additional cable to so that communications can proceed even when the normal network communication mode fails. This further increases hardware and installation costs.

SUMMARY

A system and method are disclosed for providing backup communications over the Ethernet cabling used for normal network communications, thus eliminating the need for additional backup communications cabling. The system and method can communicate basic system status (e.g., patient calls) over existing network Ethernet cabling even when some component of the TCP/IP system has failed. Existing network Ethernet cabling is used to carry signals between communications devices located in one or more patient rooms and one or more nurses' stations. These signals may comprise coded voltage pulses or the like that enable the patient rooms and the nurses' station to exchange information when the normal networked TCP/IP communication system is not functional. In some embodiments, information may be sent in both directions.

A method is disclosed for providing backup communication for a patient communication system. The method can comprise: receiving, at a backup communication system (BCS) processor, a first call signal from a patient call device; transmitting, from the BCS processor, a second call signal to a monitoring device, the second call signal being representative of said first call signal. The first call signal is transmitted on a secondary communication mode of an Ethernet cable. The secondary communication mode is different from a primary communication mode of said Ethernet cable.

A system is disclosed for providing backup communication over an Ethernet cable. The system can include a backup communication system (BCS) processor for receiving a first call signal from a patient room terminal. The BCS processor can be configured to transmit a second call signal to a monitoring device, where the second call signal is representative of the first call signal. The first call signal is transmitted on a secondary communication path of an Ethernet cable. The secondary communication mode being different from a primary communication mode of said Ethernet cable.

BRIEF DESCRIPTION OF THE DRAWINGS

By way of example, one or more specific embodiments of the disclosed system and method will now be described, with reference to the accompanying drawings, in which.

DETAILED DESCRIPTION

A system and method are disclosed for enabling backup communication over Ethernet cabling when a normal TCP/IP communication mode is non-functional. The system and method can communicate basic system status (e.g., patient calls) over existing Ethernet cabling even when some component of the TCP/IP system has failed. The disclosed system and method utilizes a single Ethernet cable for transmitting signals between patient rooms and a nurses' station or other monitoring location.

In one embodiment, the disclosed system and method use a common-mode signal on the Ethernet cabling as a secondary communication mode between at least one patient room and at least one monitoring station, such as a nurses' station. In one embodiment, voltage-coded data is sent on existing Ethernet wires to enable patient rooms and nurses' stations to communicate with each other when the TCP/IP system is not functioning. In one non-limiting exemplary embodiment, a communication device in the patient's room can transmit one or more 10 V signal pulses to represent a patient call. Likewise, one or more 15V signal pulses can represent a patient emergency, while one or more 24V signal pulses can represent a "code" call (i.e., an emergency call initiated by hospital personnel). Appropriate pulsing and sensing circuitry can be provided in the patient room terminal and the nurses' station to send and receive these signals.

Figure 1A:
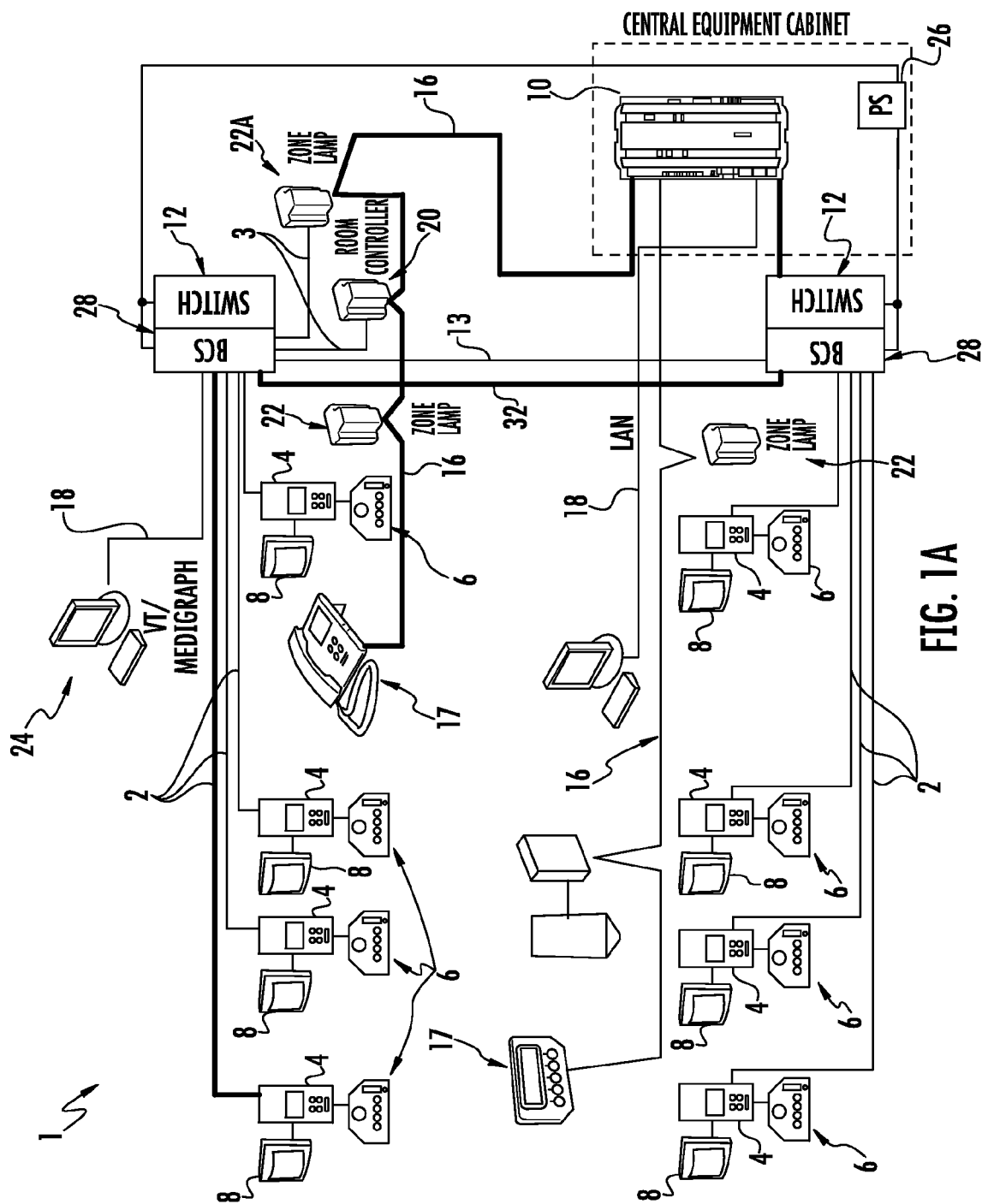
FIG. 1A is a schematic of an exemplary communications system for use in exchanging information between a plurality of patient rooms and at least one monitoring station.

Referring now to FIG. 1A, an exemplary networked communication system 1 is shown. As can be seen, the system 1 includes Ethernet cabling 2 connected to a variety of patient room terminals 4. The patient room terminals can include one or more communication devices, which can include a patient call device 6 and a room light 8. In general, room terminal 4 is mounted on the wall inside the door of the patient room, and is coupled to the patient call device 6, which is mounted on the wall adjacent to the patient bed. The room light 8 is typically mounted outside the room, in the hall, above the doorway. The Ethernet cabling 2 may connect the room terminals 4 to a network server 10 via a switch 12, which in one non-limiting exemplary embodiment is a Power over Ethernet (PoE) switch. The network server 10, which may include a TCP/IP gateway, may provide connections to one or more devices operating on another network, such as a local operating network (LON) 16 and/or a local area network (LAN) 18. Many traditional (i.e., legacy) hospital communications systems utilize a LON architecture, and as such the disclosed backup communication system may include features that enable it to interoperate with such legacy technology. The LON 16 may include one or more connections to a nurses' station 17, while the LAN 18 may facilitate connection to local workstations throughout the hospital.

The switch 12 can be connected to a room controller 20 and a zone lamp 22 via a signal wire 3. As will be understood, the room controller 20 and zone lamp 22 may be devices that are located on a legacy communications system such as a LON 16. The room controller 20 is normally configured to control one or more functions of a patient room terminal 4, while the zone lamp 22/22A is connected to the room controller 20 and is typically used to convey specific patient call information (e.g., via a colored-coded light) to hospital personnel located in a hallway. As will be disclosed in greater detail later, the disclosed backup communication system utilizes the room controller 20 and zone lamp 22/22A as communications paths to the LON 16. The signal wire 3 can be a standard call line that exists between the room controller 20 and a patient room terminal 4.

As noted, the room controller 20 can operate to receive communications from one or more room terminals 4 and send them to the LON 16, enabling personnel to monitor the communications, for example, at nurses' station 17. The switch 12 can also be connected to one or more LAN-enabled external workstations 24 which can be running any of a variety of system control, monitoring and/or data processing software. In one embodiment, the external workstation 24 is located in a nurses' station, and station 17 is a secondary station having reduced display and call functionality. In the illustrated embodiment, the system 1 includes a pair of switches 12 coupled to respective sets of room terminals 4. The switches 12 may be connected via an Ethernet cable 32 as well as a cascading bus 13. The Ethernet cable 32 may be used to ensure that both switches are connected to the LAN 18, while the cascading bus 13 may be used to convey backup communications information between switches. It will be appreciated that the system 1 may include fewer or greater than two switches 12, and that each switch may be associated with one or more room terminals 4. The switches 12 are illustrated as being connected to a single power supply 26, though separate and/or redundant power supplies can also be provided.

Thus arranged, the Ethernet cabling 2 is monitored for calls initiated by one or more of the patient call devices 6, and reports those calls to a variety of locations throughout the system. For example, the calls can be transmitted to the nurses' station 17 on the LON 16 via the room controller 20 and/or zone lamp 22. Likewise, the system 1 can receive call information from the nurses' station 17 via the LON 16 and can report it back to the patient call device 6 in the originating patient room as well as other patient rooms.

Figure 1B:
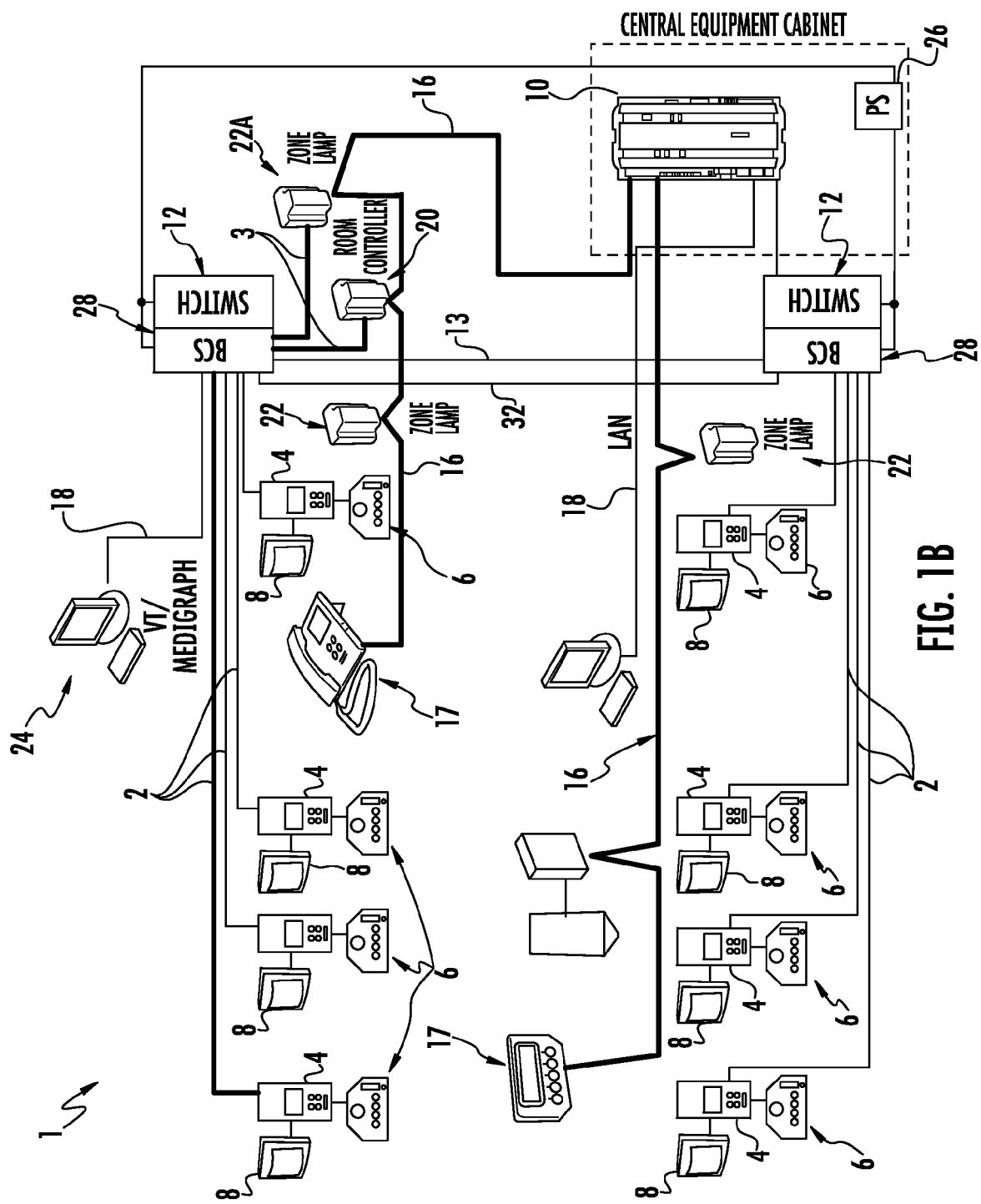
FIG. 1B is the schematic of the communications system of FIG. 1A showing an exemplary backup communications path.

FIG. 1A shows an exemplary "normal" communications path through the system 1 when an "event" is signaled from a patient call device 6. The room terminal 4 associated with the patient call device 6 sends a signal on a primary communication mode of the Ethernet wiring 2, through the BCS 28, across the Ethernet wiring 13 to the second BCS 28, through the switch 12, to the gateway 10, then to the LON 16 where zone lamps 22, 22a and the nurses' station 17 reside. FIG. 1B shows an exemplary "backup" communication path when an "event" is signaled from the same patient call device 6. This time the room terminal 4 associated with the patient call device 6 sends a signal on a secondary communication mode of the Ethernet cable 2 to the BCS 28. The signal is then passed through signal lines 3 to the room controller 20 and zone lamp 22A, where the signal is passed to the LON 16, where the nurses' station 17 resides. Reverse communications (i.e., from nurses' station 17 to one or more room terminals 4) can use the same path.

In one embodiment, the backup communication system 28 is an independently functioning module within the switch 12. Alternatively, it could be a module that is separate from the switch 12. Where the backup communication system 28 is a module in the switch 12, it can reside as a pass-through device on the Ethernet wiring, and can be capable of applying and detecting basic call information to and from those wires. As previously noted, this call information can include normal patient calls, emergency patient calls, and code calls etc. The backup communication system 28 can allow communication of information between individual room terminals 4, and can also provide an interface between room terminals 4 and devices connected on the LON 16. The LON interfacing approach may be in the form of a standard call line output for interfacing to a room controller 20 and a circuit capable of responding to lamp outputs from, in one embodiment, a zone lamp 22. Additionally, although two switches 12 are illustrated, the backup communication system 28 can interconnect a multiplicity of switches 12 for the purpose of sharing information throughout the patient communication system 1 when the normal TCP/IP communication mode is nonfunctional. In one embodiment, a single room controller/zone light pair 20, 22A will be used per logical group of switches 12. A "logical group" of switches 12 can be defined as a unit or as a zone, as desired for individual applications. This can be advantageous where the overall system 1 covers many physical areas (e.g., hallways, buildings), or logical groups (e.g., surgery, labor & delivery, recovery), and where it may be desirable that a particular call not be annunciated across all the areas and/or groups.

Figure 2:
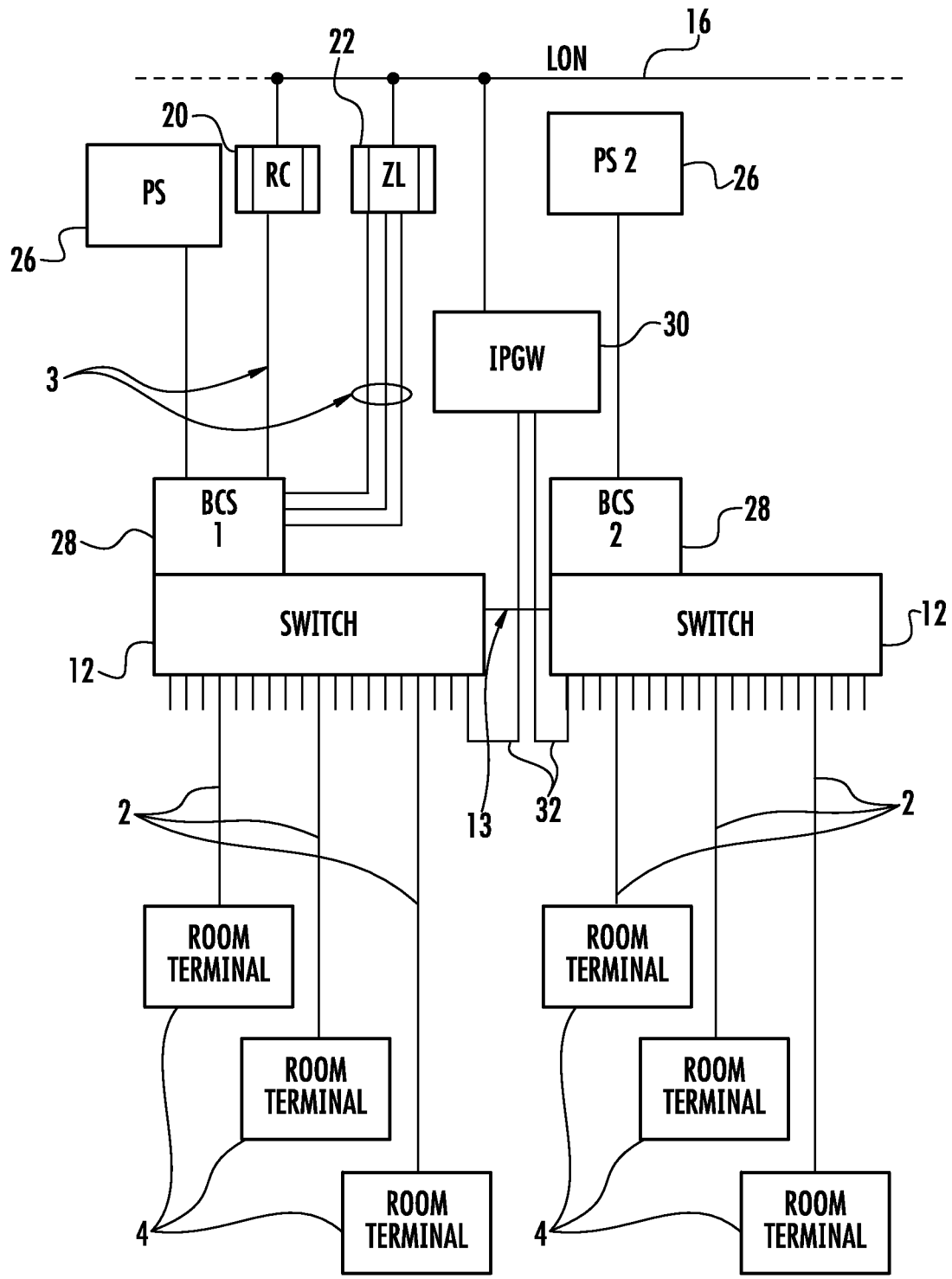
FIG. 2 illustrates an exemplary wiring arrangement for a backup communication system portion of the system of FIG. 1A.

FIG. 2 shows an exemplary interconnection between the backup communications system 28, switches 12, LON 16 and TCP/IP gateway 30 which is used to enable normal network intelligent communications throughout the patient communication system 1 of FIG. 1A. In this embodiment, the backup communication system 28 is coupled to the room controller 20 for enabling backup communication signals to be transmitted to the LON 16. Signals from the LON 16 can be returned to the backup communication system 28 via the zone lamp 22. The switches 12 are interconnected via an inter-switch cascading bus 13 so as to enable communications between the backup communication system 28 associated with each switch (i.e., to enable room terminals 4 to communicate with each other). In this embodiment, power is supplied to each switch 12 via a separate power supply 26. Ethernet wiring 2 couples the room terminals 4 to the switches 12 and backup communication systems 28. As will be understood, the Ethernet wiring 2 may also supply operational power to the room terminals 4. The switches 12 are coupled to the TCP/IP gateway 30 via Ethernet cables 32. The embodiment shown in FIG. 2 shows a single LON 16 connection to the TCP/IP gateway 30, whereas FIG. 1A shows a pair of LON connections to the gateway 30. With the FIG. 1A arrangement, the two LON wires 16 coupled to the gateway are physically connected so that even if the gateway 30 is non-functional, devices on both LON 16 branches can still communicate with each other.

As previously noted, the illustrated embodiments show the backup communication system 28 as residing within the respective switch 12. It will be appreciated that this is not critical, and that the system 28 can be separate from the respective switch 12. As will be appreciated, integrating the backup communication system 28 into the switch 12 can reduce cost and simplify wiring. By contrast, separating them may allow using an off the shelf Ethernet Switch and may also increase wiring flexibility.

FIG. 2 shows zone light 22 and room controller 20 connected to transmit calls between the backup communication system 28 and the LON 16. As previously noted, the room controller can function to receive signals from the backup communication system 28 (i.e., non-TCP/IP) and relay them to the LON (i.e., TCP/IP) side of the system 1 so that nurses and personnel at other locations can be aware of emergency call condition, as necessary. The zone light 22 can function to transmit information from the LON 16 side of the system 1 to the backup communication system 28 and room terminal 4. It will be appreciated that it is not critical that a separate room controller and zone lamp be provided. Instead, a hybrid device could be used that combines the zone light and room controller functionality. Likewise, the BCS may transmit call information directly to an annunciating lamp or sounder via additional wiring (not shown).

Figure 3:
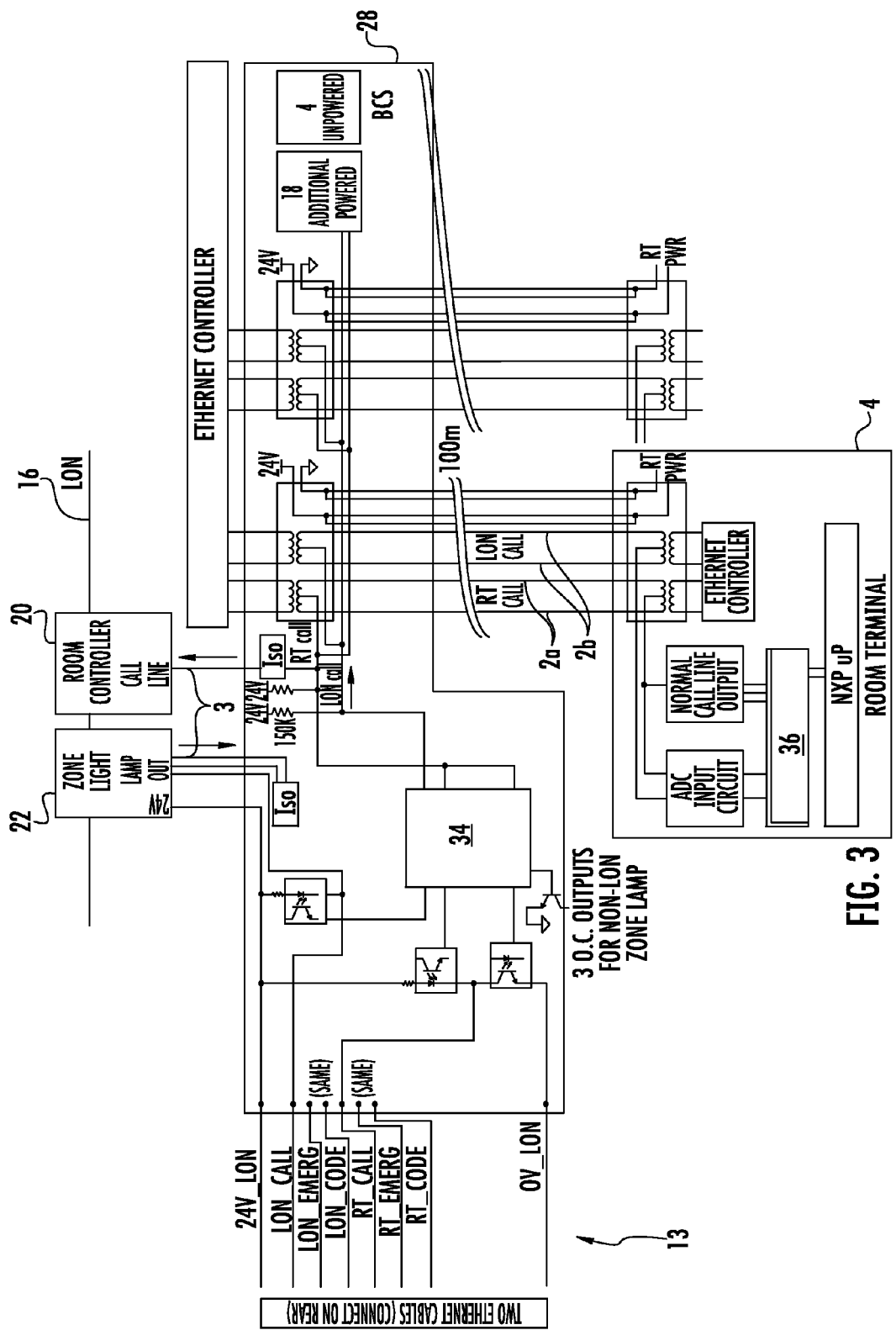
FIG. 3 is a block diagram illustrating the disclosed backup communication system and its integration with portions of the communications system of FIG. 1A.

Referring now to FIG. 3, the backup communication system 28 includes a processor 34 for receiving signals from the room terminal 4 via Ethernet cable 2 and for transmitting signals to the room controller 20 via signal cable 3. The backup communication system 28 can also receive signals from the LON 16 via the zone lamp 22 and signal cable 3.

In the illustrated embodiment, when the backup system is active, one pair of wires 2a of the Ethernet cable 2 are used for calls out from the room terminal 4 to the backup communication system 28, and another pair of wires 2b are used for return calls in to the room terminal 4. The room terminal 4 can include a processor 36 for controlling the signaling functions when a patient activates a call.

As noted, backup (i.e., non-TCP/IP) calls initiated from the room terminal are transmitted via wires 2a to the backup communication system 28. The system processor 34 receives the signal and controls the application of one or more voltage pulses to the room controller via signal cable 3. The applied voltage pulses will be representative of the signals received by the backup communication system 28 from the room terminal 4, and may represent different types of calls. As previously noted, the pulses can be set at predetermined values to signify a particular event, such as 5V for a patient call, 10V for a patient emergency, and 24V for a code call. Similar or different voltage pulses can also be received by the processor 34 via the zone lamp 22 and signal cable 3. These received pulses can represent messages sent back from the LON 16 to one or more of the room terminals 4. These messages can be passed along to the room terminal 4 via Ethernet wires 2b. Wires 2b may be unidirectional signal wires. Wires 2a may be bidirectional so that the room terminals 4 may receive signals from a nurses' station 17 via the LON 16, and also so they can report to other connected room terminals directly and be able to receive calls from other room terminals residing on separate switches via the inter-switch cascading bus 13.

In one embodiment, the backup communication system 28 functionality is constantly "on", even when the primary system is working. It will be appreciated, however, that such "constant on" functionality is not critical. For example, the room terminals 4 may be employed to recognize a failure in the gateway 30 and "turn on" the backup communication system 28. In one embodiment, the room terminals 4 could send a sync pulse via for example, the zone lamp 22A, to indicate that a failure of the gateway 30 has occurred. The backup communication system 28 could recognize the sync pulse and begin transmitting information in backup mode.

As previously noted, the backup communication system 28 operates by transmitting patient call data as a common-mode signal (e.g., voltage pulses) on wires of the Ethernet cable 2, in-phase and with equal amplitudes. These voltage-coded "calls" can be in a "pseudo-PoE" form, in which meaningful information (i.e., call information) is being coupled to the wires 2a, 2b. These signal voltages can be the same voltages used for normal call lines, or they can be different. The DC components of the backup communication system 28 can be isolated from the PoE 24V input for cases in which the connected room controller 20 and zone light 22 reside on a separate power supply. Additionally, the inter-switch backup communication system cabling can be optically isolated in case cascaded switches reside on different power supplies. In one embodiment, the backup communication system voltages is hard-wired at 10V (representing a patient call), 15V (representing a patient emergency call), and 24V (representing a code call). These values may be programmed in the room controller 20 and zone light 22 to facilitate desired transmission to/from the LON. Thus, in one embodiment, the room controller receives the 10V, 15V and/or 24V "calls", recognizes what the particular voltages mean, and forwards that information intelligently over the LON 16, which is an RS485 communication path. In turn, the zone light 22 indicates if there is a patient call (10V), emergency call (15V), or code call (24V) active on the LON. That info is used to activate the "LON call" (2b) signal of the backup communication system 28. In addition, it is contemplated that other call-representative voltage levels can be used in lieu of the described 10V/15V/24V scheme.

In an exemplary embodiment, one pair of wires of the Ethernet cable 2 may be used for calls generated by the room terminals 4 out to the LON 16 (via room controller 20), and another pair of wires of the Ethernet cable 2 may be used for calls coming in to the room terminals 4 from the LON 16 (via the zone lamp 22). It will be appreciated that enabling the LON 16 to send signals back to the room terminals 4 can be advantageous. For example, in response to a call signal received from a call device on the LON 16, the LON 16 can send signals through the backup communication system 28 to a plurality of room terminals 4 so that a nurse or other personnel located in a nearby room can respond quickly to a call Likewise, Room Terminals 4 can respond to calls from other Room Terminals 4.

Figure 4:
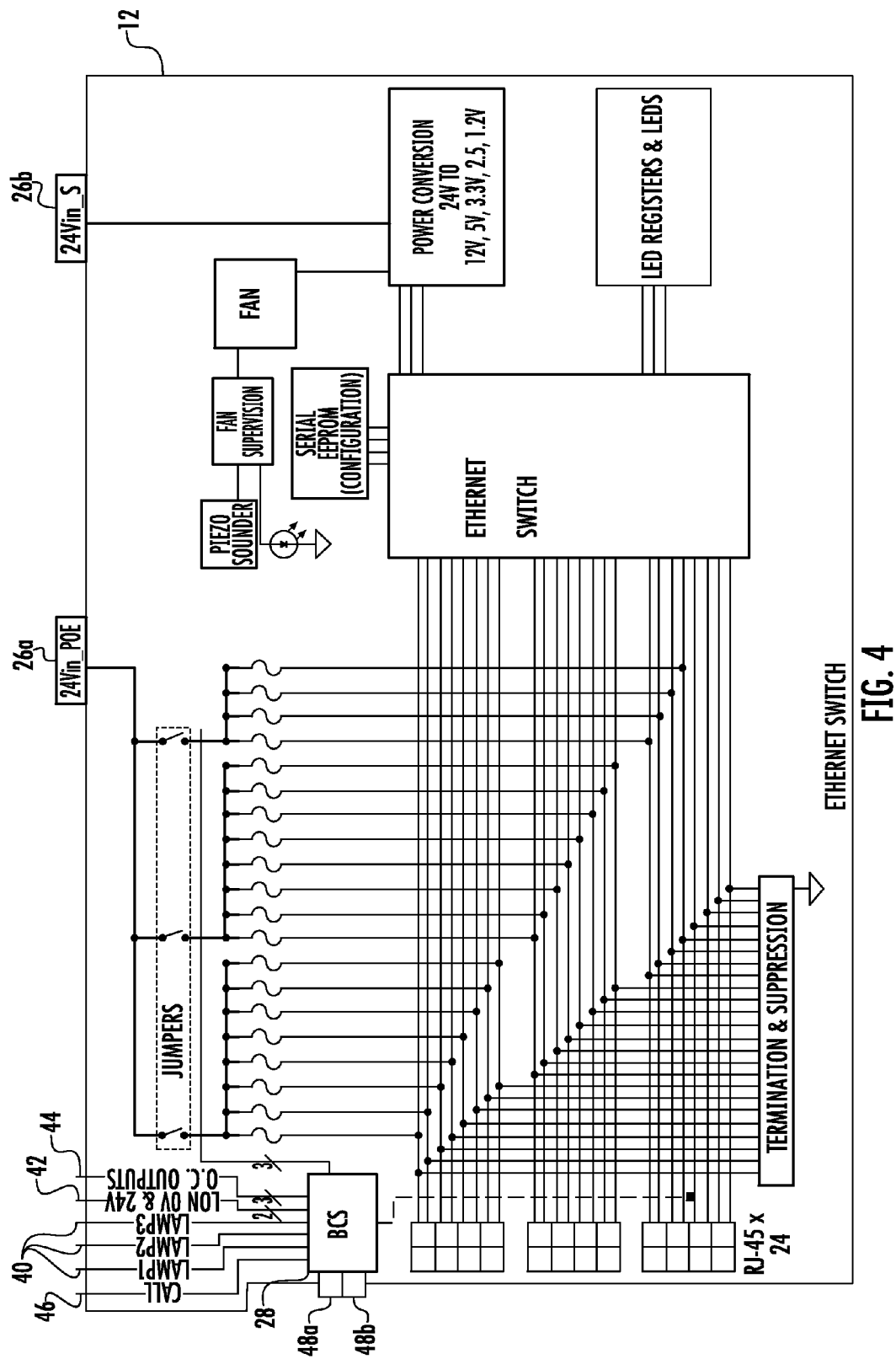
FIG. 4 is a schematic of an exemplary power over Ethernet switch integrating the disclosed backup communication system.

FIG. 4 illustrates an embodiment in which the backup communication system 28 is incorporated into the switch 12. The switch can be an unmanaged switch requiring no configuration. It can have a non-power-limited input 26a for connection to the system power supply, and a second power-limited connection 26*b* for Ethernet switch power. In one embodiment, the power to each port will be rated at 1 Amp.

External connections from the backup communication system portion of the switch 12 may consist of zone lamp inputs 40, power 42, ground 44, and a call line 46. Additionally, there can be two RJ45 connectors 48*a*, 48*b* for interconnection of the backup communication system 28 to/from cascaded switchs 12.

The backup communication system 28 can reside within the switch as a functionally separate module. As previously described, the backup communication system 28 includes a processor 34 to manage backup communication. It will be appreciated that it is not critical that the backup communication system 28 include a processor 34, and that the functions of the processor could be implemented entirely in hardware.

It will be appreciated that the previously described voltage coding of call signals is but one technique for providing signaling via the backup communication system 28. Alternatives to voltage coding include, but are not limited to, RS485, pulsed coding, a form of AC signaling, and binary coding between two wire pairs of the Ethernet cable 2. In such alternative arrangements, similar connections from the room terminals 4 would be used, but rather than coupling voltages to the wires an RS45 transceiver or other interface could be coupled to the center tap of the Ethernet RJ-45 jacks. In addition, it is contemplated that intelligent communication (i.e., more than simply identifying generic events or calls) is possible using a series of coded voltage pulses that can be decoded by the system 1 using a predetermined scheme.

The backup communication system 28 has been described as sending and receiving communications over data wires of the Ethernet cable 2. It will be appreciated, however, that communications to/from the backup communication system 28 can also be sent over the normally unused pair of wires of the Ethernet cable 2.

The backup communication system 28 may also be used to supervise the physical LAN cabling of the patient communication system 1. For example, if one or more wires of the Ethernet cable 2 were to break between the room terminal and the backup communication system 28, it would be possible to discern that a line breakage has occurred, as opposed to simply assuming that the TCP/IP Gateway 30 is not functioning. In one embodiment, a voltage could be impressed on the wires at one end and measured on the opposite end, or current could be passed on the wires that could be measured on the opposite end. Absence of voltage/current at the opposite end would indicate a break.

In a further embodiment, the backup communication system 28 could be used to communicate an analog signal over the Ethernet cable 2. For example, an audio frequency could be provided on the same wires of the Ethernet cable 2. This would enable backup microphone communication to/from the room terminal 4 when the TCP/IP gateway 30 is not functioning. In one embodiment, a driver such as an op-amp would be provided to drive the audio signal on the wires. Another op-amp could be provided at the opposite end for receiving the signal.

Figure 5:
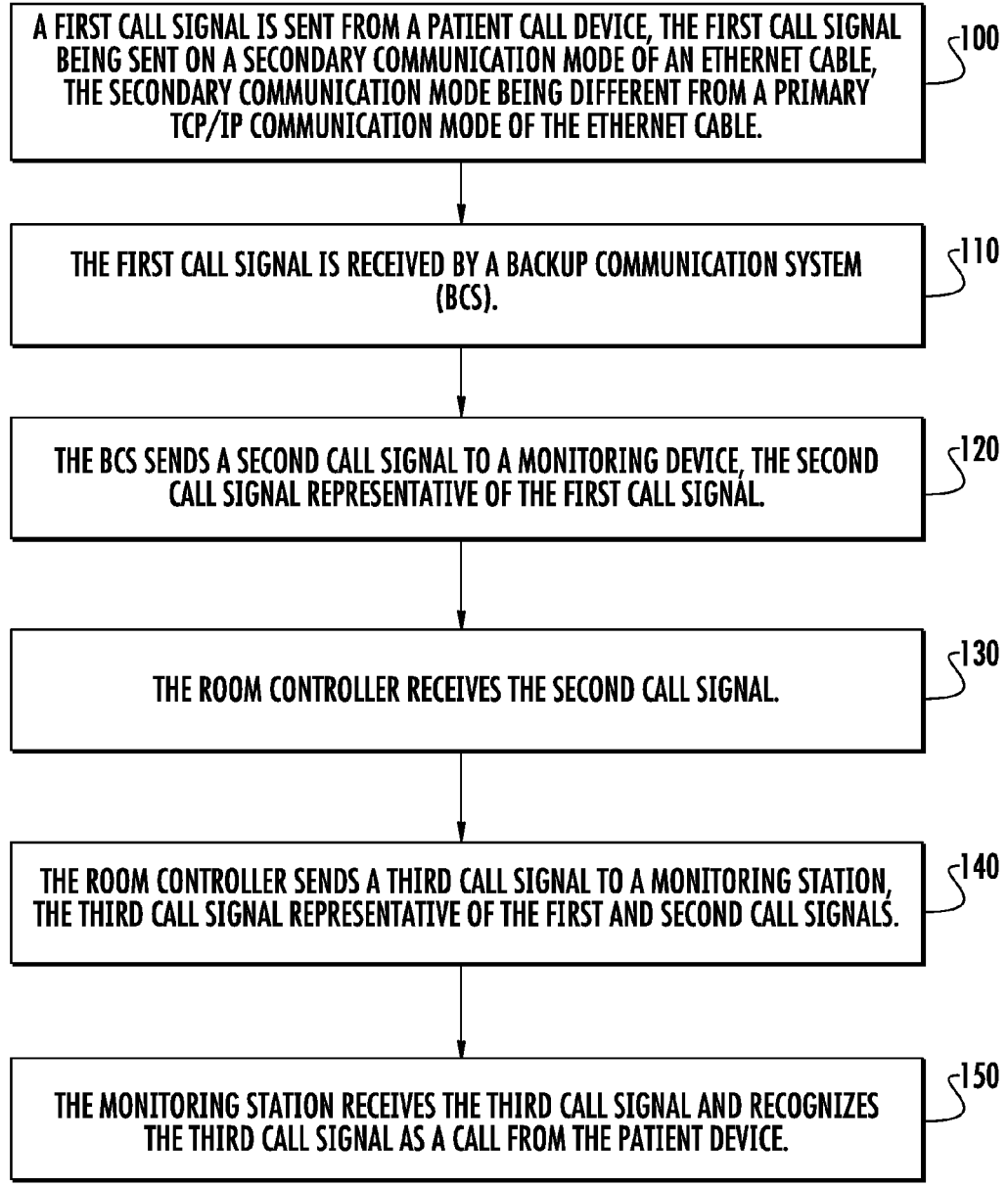
FIG. 5 is a flow chart illustrating a first exemplary method of operating the disclosed backup communication system.

Referring now to FIG. 5, a first exemplary method of operating the disclosed backup communication system 28 will be described. At step 100, a first call signal is sent from a patient call device, the first call signal being sent on a secondary communication mode of an Ethernet cable, the secondary communication mode being different from a primary TCP/IP communication mode of the Ethernet cable. At step 110, the first call signal is received at a backup communication system (BCS). At step 120, the BCS sends a second call signal to a monitoring device, which in one embodiment is a room controller, the second call signal being representative of the first call signal. At step 130, the monitoring device receives the second call signal. At step 140, the monitoring device sends a third call signal to a monitoring station, which in one embodiment is a nurses' station, the third call signal representative of the first and second call signals. At step 150, the monitoring station receives the third call signal and recognizes the third call signal as a call from the patient device 1.

Figure 6:
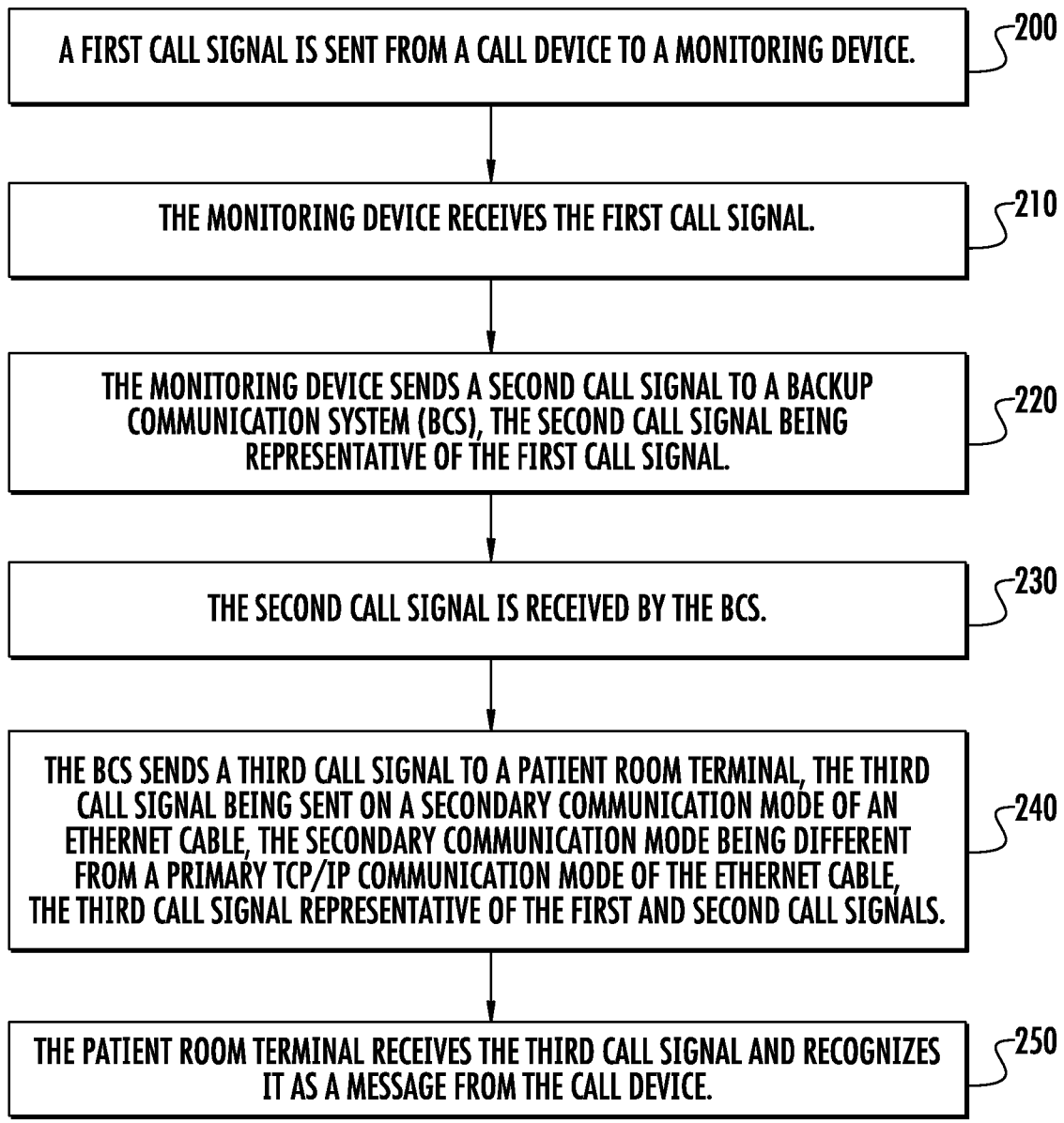
FIG. 6 is a flow chart illustrating a second exemplary method of operating the disclosed backup communication system.

Referring now to FIG. 6, a second exemplary method of operating the disclosed backup communication system 28 will be described. At step 200, a first call signal is sent from a call device to a monitoring device, which in one embodiment is a zone lamp. At step 210, the monitoring device receives the first signal. At step 220, the monitoring device sends a second call signal to a backup communication system (BCS), the second call signal being representative of the first call signal. At step 230, the second call signal is received by the BCS. At step 240, the BCS sends a third call signal to a patient room terminal, where the third call signal is sent on a secondary communication mode of an Ethernet cable, the secondary communication mode being different from a primary TCP/IP communication mode of the Ethernet cable. The third call signal representative of the first and second call signals. At step 250, the patient room terminal receives the third call signal and recognizes it as a message from the call device.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. The term computer is not limited to just those integrated circuits referred to in the art as computers, but broadly refers to, microprocessors, microcontrollers, microcomputers, programmable logic controllers, application specific integrated circuits, and other programmable circuits, and these terms are used interchangeably herein.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto

What is claimed is:

1. A method for providing backup communication, comprising:
   determining whether Ethernet communication using an Ethernet gateway coupled to an Ethernet switch and a patient call device is non-functional, the Ethernet gateway, the Ethernet switch, and the patient call device interconnected through a hospital local area network;
   receiving, at a backup communication system (BCS) processor coupled to the patient call device, a first call signal from the patient call device; and
   transmitting, from the BCS processor, a second call signal to a monitoring device, said second call signal representative of said first call signal;
   wherein the first call signal is transmitted on a secondary communication mode of an Ethernet cable, the secondary communication mode being different from a primary communication mode of said Ethernet cable.

2. The method of claim 1, wherein the primary communication mode is a TCP/IP communication mode.

3. The method of claim 2, wherein the secondary communication mode employs a common-mode signal on the Ethernet cable.

4. The method of claim 1, wherein the first call signal comprises voltage-coded data.

5. The method of claim 4, wherein the voltage-coded data includes a voltage representative of a predetermined patient event.

6. The method of claim 1, further comprising sending, from the monitoring device, a third call signal to a monitoring station, wherein the third call signal is representative of the first and second call signals.

7. The method of claim 6, wherein the monitoring station recognizes the third call signal as a predetermined patient event initiated at a patient room associated with the patient call device.

8. The method of claim 1, wherein the first and second call signals comprise a voltage level selected from the list consisting of: 10V, 15 V and 24 V.

9. The method of claim 1, wherein the first call signal comprise a voltage level, where a first voltage represents a patient call, a second voltage represents a patient emergency call, and a third voltage represents a code call.

10. The method of claim 9, wherein the monitoring device is configured to convert the second call signal to a format recognizable by the monitoring station.

11. The method of claim 1, further comprising, receiving, at the BCS processor, an analog signal on the Ethernet cable, the analog signal representative of an audio communication from the patient call device.

12. The method of claim 1, further comprising at least one of (a) impressing a voltage, and (b) passing a current, on one portion of the Ethernet cable and measuring the voltage or current at another portion of the Ethernet cable, where the absence of measured voltage or measured current indicates a malfunction of the Ethernet cable.

13. A system for providing backup communication over an Ethernet cable, comprising:
   a backup communication system (BCS) processor for receiving a first call signal from a patient room terminal;
   the BCS processor configured to determine whether Ethernet communication using an Ethernet gateway coupled between an Ethernet switch and the patient room terminal is non-functional, the Ethernet gateway, the Ethernet switch, and the patient room terminal interconnected through a hospital local area network;
   the BSC processor further configured to transmit a second call signal to a monitoring device, said second call signal representative of the first call signal;
   wherein said first call signal is transmitted on a secondary communication mode of an Ethernet cable, the secondary communication mode being different from a primary communication mode of said Ethernet cable.

14. The system of claim 13, wherein the primary communication mode is a TCP/IP communication mode.

15. The system of claim 14, wherein the secondary communication mode employs a common-mode signal on the Ethernet cable.

16. The system of claim 13, wherein the first call signal comprises voltage-coded data.

17. The system of claim 16, wherein the voltage-coded data includes a voltage representative of a predetermined patient event.

18. The system of claim 13, wherein the monitoring device is configured to transmit a third call signal to a monitoring station, wherein the third call signal is representative of the first and second call signals.

19. The system of claim 18, wherein the monitoring station recognizes the third call signal as a predetermined event initiated at a patient room associated with the patient call device.

20. The system of claim 13, wherein the first and second call signals comprise a voltage level selected from the list consisting of: 10V, 15 V and 25 V.

21. The system of claim 20, wherein the first call signal comprise a voltage level, where a first voltage level represents a patient call, a second voltage level represents a patient emergency call, and a third voltage level represents a code call.

22. The system of claim 21, wherein the monitoring device is configured to convert the second call signal to a format recognizable by the monitoring station.

23. The system of claim 13, wherein the BCS processor is configured receive an analog signal on the Ethernet cable, the analog signal representative of an audio communication from the patient call device.

24. The system of claim 13, the BCS processor configured to recognize the presence or absence of a voltage or a current on the Ethernet cable, where the presence of the voltage or the current indicates the Ethernet cable is functional, and where the absence of the voltage or the current indicates a malfunction of the Ethernet cable.

* * * * *